Patented May 31, 1927.

1,630,763

UNITED STATES PATENT OFFICE.

PAUL H. RAYMER, OF EAST ORANGE, NEW JERSEY.

CHEWING GUM.

No Drawing.     Application filed June 26, 1925. Serial No. 39,832.

My present invention relates to chewing gum and, more particularly, to a chewing gum composition capable of neutralizing the acidity of the mouth, and to provide a slow acting neutralizing agent of great neutralizing capacity without interfering with the desired chewing quality of the gum.

In a chewing gum composition of this character, the quantity of the basic or acid neutralizing material in the gum must be very small, as otherwise, its bulk would tend to separate the gum into particles and to decrease its cohesiveness and thus impair or destroy its chewing qualities. To provide the required neutralizing action, therefore, the neutralizing material must be of a concentrated character. As the quantity of acid in the mouth at a time is not great but is constantly replenished by the secretions of the glands, acid fermentations or other causes, a substance that would give a momentary high alkalinity would not be desirable, as the temporary high alkalinity would, in itself, be objectionable and there would be no relief from the following acid secretions or generation.

An object of my present invention is to provide a gum composition having the desired chewing qualities and having a lasting acid neutralizing action.

Another object of my invention is to provide a chewing gum having an acid neutralizing constituent of a maximum neutralizing capacity without modifying or impairing the taste or chewing qualities of the gum to a noticeable extent.

Further objects and features of my invention are to provide a chewing gum having the same qualities as milk of magnesia and to provide a gum structure or article in which the acid neutralizing constituents are incorporated with the least modification or interference with the appearance or taste of the gum.

With these and other objects in view, the invention comprises the gum described and set forth in the following specification and claims.

In my present invention, in the accomplishment of the above outlined objects, I incorporate in the pieces of gum a small quantity of magnesium hydroxide or oxide or equivalent basic compound of low molecular or equivalent weight, these compounds being the acid neutralizing constituents of milk of magnesia. Owing to the low atomic weight of magnesium and to its valence of two, its oxide and hydroxide have a very low equivalent weight, the equivalent weight in these compounds being thirty or less, and, accordingly, a small quantity of the oxide or hydroxide has a relatively very high acid neutralizing capacity. I therefore find that about one tenth of a grain of the oxide or an equivalent quantity of the hydroxide is sufficient for each stick or nugget of the gum and this is the preferred quantity. A somewhat larger quantity of the magnesium oxide or hydroxide may, however be used without impairing the quality of the gum. Ordinarily about one grain would be the maximum that would be used in a stick or nugget of ordinary size.

The above quantity of the magnesium oxide or hydroxide is sufficient to neutralize the acidity of the mouth over a long period of time, keeping the mouth neutral during the length of time the gum would ordinarily be masticated. While a slight excess of acid will rapidly dissolve the oxide or hydroxide and thus be neutralized, the hydroxide or oxide dissolves but slowly in neutral solution and the resulting solution has such a weak alkalinity that there is no danger of the mouth becoming alkaline to an objectionable extent. The slight solubility of the magnesium oxide or hydroxide, particularly when disseminated throughout the gum being masticated, also tends to spread its neutralizing action throughout the period of mastication of the gum and to confine this action to the mouth.

Any suitable or desired gum composition may be used in which to incorporate the magnesium oxide or hydroxide. The gum may be made, for example, either of chicle or of chicle substitutes, such as purified rubber, or asphalts, or paraffine, or of mixtures of these various gums. In addition to the gum and magnesium oxide or hyroxide, the desired flavoring substances and sugar are incorporated in the mixture.

The magnesium compounds may be ground into the gum and thus disseminated therethrough or may be incorporated in a coating of sugar enclosing a central body or mass of the gum composition. The latter arrangement is preferred. In forming a finished piece of gum, therefore, which would for example, have a sugar coating of approximately ten to twelve grains' weight, about one tenth of a grain of magnesium oxide or its equivalent is incorporated in the coating composition. The magnesium compounds may be introduced into the composition in any desired form, such for example as in any of the products known as "milk of magnesia", and it is to be understood that the terms "magnesium oxide" or "magnesium hydroxide" include these and other equivalent magnesium compositions. In the completed nugget, the percentage of the oxide would be about one percent in the coating and less than one percent of the total weight of the finished nugget, the weight of the magnesium oxide in a nugget of the normal size of thirty grains being about three tenths of a percent in the above example. This quantity of magnesium oxide or hydroxide has no noticeable effect on the chewing quality of the gum or of the coating. During the mastication of the gum, particles of the magnesium hydroxide which reach the surface of the mass readily dissolve in any acid that may be present in the saliva and neutralize it.

As an example of a piece of gum embodying my invention, a gum composition is made by mixing eighteen parts of paloge, four parts of genuine chicle, fifty-four parts of XXXX confectioner's sugar, twenty-four parts of glucose and sufficient peppermint or other flavoring to give the desired flavor. This mass is made into nuggets or pellets of the desired size and the nuggets or pellets are then coated with a composition formed of ninety-nine parts of granulated sugar and one part of magnesium oxide or an equivalent amount of the hydroxide and a flavoring substance. Fifty pounds of this coating composition are required for about 112 pounds of the gum composition.

The above invention provides a gum that will furnish a lasting acid neutralizing action capable of neutralizing a large quantity of acid without rendering the mouth alkaline to an appreciable extent. For correcting acidity of the mouth, it has an advantage over milk of magnesia in that it is held in the mouth by the gum, whereas the effects of the milk of magnesia are liable to be lost to this purpose.

As changes in structure and composition could be made within the scope of my invention, it is desired that all matter contained in the above description shall be interpreted as illustrative and not in a limiting sense.

Having described my invention, what I claim and desire to secure by Letters Patent is:

1. A chewing gum composition containing magnesium hydroxide, the quantity of the magnesium hydroxide being sufficient to neutralize the acidity of the mouth throughout the normal life of the gum, while being chewed, and being insufficient to injuriously affect the chewing quality of the gum.

2. A chewing gum composition containing magnesium hydroxide, the magnesium hydroxide being less than three percent of the weight of the gum.

3. A chewing gum pellet comprising an inner body of chewing gum composition, an outer coating of a sugar composition, and magnesium hydroxide distributed in both said inner body and said coating, the total quantity of magnesium hydroxide being less than three percent by weight of the pellet.

4. A chewing gum pellet comprising an inner body of chewing gum composition, an outer coating of a sugar composition, and a quantity of magnesium hydroxide, the quantity of magnesium hydroxide being less than three percent by weight of the pellet.

5. A chewing gum composition which comprises about twenty-two parts of gum, fifty-four parts of XXXX confectioner's sugar, twenty-four parts of glucose and a quantity of magnesium hydroxide the quantity of magnesium hydroxide being less than three percent of the weight of the gum composition.

In testimony whereof I affix my signature.

PAUL H. RAYMER.